United States Patent [19]

Schlak et al.

[11] 4,287,109

[45] Sep. 1, 1981

[54] AQUEOUS SILICONE-POLYESTER RESIN SYSTEMS, A PROCESS FOR THEIR PRODUCTION AND THEIR USE

[75] Inventors: Ottfried Schlak, Leverkusen; Hans-Heinrich Moretto, Cologne; Werner Clarenz, Leverkusen; Bernd Peltzer, Krefeld; Willi Burgmer, Berg. Gladbach, all of Fed. Rep. of Germany

[73] Assignee: Bayer Aktiengesellschaft, Leverkusen, Fed. Rep. of Germany

[21] Appl. No.: 65,671

[22] Filed: Aug. 10, 1979

[30] Foreign Application Priority Data

Aug. 12, 1978 [DE] Fed. Rep. of Germany ....... 2835443
Aug. 12, 1978 [DE] Fed. Rep. of Germany ....... 2835495

[51] Int. Cl.$^3$ ...................... C08L 83/06; C08L 67/02
[52] U.S. Cl. ........................ 260/29.2 M; 260/29.2 E; 428/447; 525/446
[58] Field of Search .................. 260/29.2 E, 29.2 M; 525/446

[56] References Cited

U.S. PATENT DOCUMENTS

| | | | |
|---|---|---|---|
| 3,044,980 | 7/1962 | Modic et al. | 525/446 |
| 3,655,602 | 4/1972 | Sekmakas | 525/446 |
| 3,813,351 | 5/1974 | Thomson | 260/29.2 EP |
| 3,919,438 | 11/1975 | Urkevich | 525/446 |
| 4,069,178 | 1/1978 | Mikami et al. | 260/29.2 E |

*Primary Examiner*—Theodore E. Pertilla
*Attorney, Agent, or Firm*—Sprung, Felfe, Horn, Lynch & Kramer

[57] ABSTRACT

The instant invention relates to an aqueous silicone polyester resin system having a silicone content of at least 30% by weight, based on the solid binder, comprising a polyester resin having an acid number of from 50 to 170; a silicone precondensate with SiOH or SiOR-functionality; or a silicone-polyester-combination resin; having from 0 to 80% by weight, based on the solid binder, of an organic solvent; from 0 to 10% by weight, based on the solid binder, of an emulsion or dispersion auxiliary; a nitrogen base; and optionally at least one pigment or filler.

The invention relates also to the production of the silicone polyester-resin system and to the use of the resin in aqueous lacquer materials.

10 Claims, No Drawings

AQUEOUS SILICONE-POLYESTER RESIN SYSTEMS, A PROCESS FOR THEIR PRODUCTION AND THEIR USE

This invention relates to aqueous silicone polyester combination resin systems, their production and their use as lacquers and as lacquer binders, finishing and coating compositions with a good pigment absorption capacity for the production of stoving lacquers having good resistance to weather and heat, durability of lustre, adhesion, colour maintenance, rigidity, elasticity and slight thermoplasticity.

Aqueous coating and finishing mixtures are known. Thus, for example, aqueous polyester and alkyd resins, preferably in combination with amino plastics, are used as aqueous stoving lacquers. Recently, particular attention has been paid to these mixtures because they have advantages over the conventional finishing mixtures based on organic solvents.

Organic solvents are generally inflammable, and toxic and foul-smelling vapours, which have to be processed, are liberated during the curing operation when using coating and finishing mixtures based on organic solvents.

Aqueous binder systems do not have these disadvantages and, in addition, are less expensive. They can be processed, for example, by dissolving or emulsifying and dispersing an organic resin containing sufficient acid groups in water with the aid of the base. Previously known aqueous binder systems composed of polyester and alkyd resins do not, however, demonstrate sufficient weather- and heat-resistance and adequate durability of lustre and constancy of colour in many cases.

It is known that the good lacquering properties of polyester resins with regard to elasticity, surface hardness, resistance to chemicals and pigment absorption capacity can be improved with respect to the defects listed above by mixing or combining them with silicone resins. Coatings and finishes which combine the desirable properties of the two above-mentioned resins are thus formed. With pure mixtures, without chemical reaction of the silicone precondensate and polyester, it has, however, frequently been observed that the silicone or organopolysiloxane and the polyester are not compatible with each other in these compositions if they are used for coating purposes, and the stability to heat of comparable silicone polyester combination resins is not achieved.

Combination resins of this type, based on organic solvents, are described, for example, in German Auslegeschriften Nos. 1,178,540 and 2,232,419 and U.S. Pat. No. 3,044,980. Attempts to complement the advantages of the water-soluble or water-dilutable polyester resins with the advantages of the silicone resins are, however, obstructed by the generally extreme incompatibility of silicone resins with water.

It is known from U.S. Pat. No. 3,513,083 that an electrophoresis bath can be produced from an aqueous resin mixture containing from 1 to 20% by weight of polyester and formaldehyde resin and from 0.5 to 5% by weight of silicone resin. In this process, the silicone resin is added as an emulsion or in the form of a silicone-modified formaldehyde resin. It is, however, preferable to add only 2 to 3% by weight of silicone resin (based on the mixture). The formaldehyde resin addition does not, however, allow coatings of this type which are suitable for high temperature stresses to appear. The silicone content is also too small to overcome this disadvantage.

A siloxane-modified water-dispersible resin which contains up to 30% by weight (based on the entire resin) of organopolysiloxane is also disclosed in U.S. Pat. No. 3,655,602. In the process of that patent, an acrylate/acrylic acid mixture, which can also contain other olefinic compounds such as, for example, styrene, is essentially polymerised radically in the presence of a combination resin composed of an aliphatic unsaturated polyester and an organopolysiloxane, or it is firstly polymerised radically and then condensed with the corresponding organopolysiloxane. Moreover, these resins can contain from 1 to 40% by weight of an amino plastic resin and can be used as a 5 to 15% mixture for electrophoretic coating processes. Coatings and finishes which have been produced by this process do not, however, withstand extreme thermal stresses owing to the high acrylic acid or acrylate content. An organopolysiloxane content of up to 30% by weight does not appear to be high enough either (cf. U.S. Pat. No. 3,044,980 and German Auslegeschrift No. 2,521,170) to overcome this disadvantage adequately. In addition, it is known that amino plastics-containing coatings and finishes tend to turn yellow under high, lasting, temperature stresses.

Aqueous polyester-siloxane compositions are also described in U.S. Pat. No. 3,813,351 and German Offenlegungsschrift No. 2,537,477. However, these are both nitrogen-containing siloxane components and it is known that they can be produced only in an expensive and complicated manner compared to the conventional SiOH- or SiOR-functional organo-polysiloxanes. Furthermore, the nitrogen-containing component promotes the yellowing tendency of the lacquer film which has started to cure.

The aqueous dispersion of a resin composition formed from a polyester resin, a polysiloxane resin, N-aldehyde resin and a fluorohydrocarbon emulsifier is described in U.S. Pat. No. 3,935,147. However, this composition has a siloxane content of only up to 5% by weight and also has the disadvantages which have already been mentioned above with respect to the N-aldehyde resin.

The production of silicone polyester combination resins in organic solvents is described in German Auslegeschrift No. 2,232,419. Nevertheless, this process is complicated by the necessity for the narrow ratio of from 1.25:1 to 0.8:1 of the number of COH groups to the number of SiOR groups, in order to achieve the properties required of the cured coatings or finishes. This complication arises particularly clearly in the production of silicone polyester combination resins having a high polysiloxane content.

An object of the present invention is therefore to produce aqueous silicone-polyester combination resin systems and mixtures thereof which have a polysiloxane content above 30% by weight and which have good properties.

Surprisingly, it is possible by the process according to the invention to produce stable, aqueous silicone polyester combination resin system and mixtures thereof which are suitable as finishing, coating and lacquer binding agents and also as lacquers, which do not have the above-mentioned disadvantages and which have a silicone resin content of from 30 to 80% by weight, based on the solid silicone polyester combination resin, in spite of the poor compatibility of organopolysiloxanes with water.

The present invention therefore provides aqueous silicone polyester combination resin systems and mixtures respectively containing a silicone polyester combination resin or a mixture thereof with a silicone content of from 30 to 80% by weight, based on the solid binder, and an acid number of from 25 to 110, from 0 to 80% by weight, based on the solid binder, of organic solvent, 0 to 10% by weight of an emulsifier or dispersing agent; nitrogen base dissolved in water and optionally pigments and/or fillers.

The invention also provides a process for the production of aqueous silicone polyester resin systems, which is characterised in that a polyester resin having an acid number of from 50 to 170, a silicone precondensate with SiOH or SiOR functionality, from 0 to 60% by weight, based on the solid binder, of an organic solvent and from 0 to 10% by weight, based on the solid binder, of an emulsion or dispersion auxiliary, are emulsified or dispersed in water with the aid of a nitrogen base to form an aqueous silicone polyester resin system and optionally reacted with pigments and fillers, and the silicone content is adjusted in such a way that it amounts to from 30 to 80% by weight, based on the solid binder.

The process is also characterised in that at first the silicone polyester combination resin is produced by heating a reaction mixture consisting of a silicone precondensate, a polyester resin containing hydroxyl and hydrocarboxyl groups, an organic solvent and optionally a catalyst, and in which the silicone precondensate has a composition corresponding to the formula:

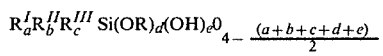

$$R^I_a R^{II}_b R^{III}_c Si(OR)_d(OH)_e O_{4-\frac{(a+b+c+d+e)}{2}}$$

in which $R^I$, $R^{II}$ and $R^{III}$ are optionally halogen-substituted, monovalent aliphatic or aromatic hydrocarbon radicals with from 1 to 8 carbon atoms, and the sum of a, b and c is 1 to 1.75 on average, d and e each have a value of from 0 to 2, the sum of d and e is from 0.5 to 2 on average, the sum of a, b, c, d and e is not greater than 3 and OR is an alkoxy, etheralkoxy, aryloxy or acyloxy radical with from 1 to 6 carbon atoms.

The present invention also relates to the use of the aqueous silicone polyester combination resin systems according to the invention as finishing, coating and lacquer binding agents and as lacquers.

The term solid binder in the context of the present invention is interpreted as the solid silicone polyester combination resin system.

The acid function of the polyester resin is obtained by reacting a proportion of the COH groups of a substantially acid-free polyester resin with a dicarboxylic acid anhydride to form the corresponding semiester. Suitable silicone precondensates include silicon-functional (according to W. Noll's definition; Chemie and Technik der Silicone/Verlag Chemie, 1968, page 3 et seq) aryl alkyl siloxane resins, preferably phenyl methyl siloxane resins having SiOH or SiOR functionality. The condensation treatment can be carried out without a catalyst at elevated temperature and with elimination of the condensation product, but a catalyst is preferably used. The components are mixed by stirring the polyester, nitrogen base, water and silicone precondensate, an emulsion or dispersion auxiliary and optionally an organic solvent and/or an aqueous pigment powder.

The base is used in a sufficient quantity for the aqueous silicone polyester combination resin and the mixture respectively to have a pH value of from 6.5 to 9. The emulsions or dispersions obtained are very stable and can be diluted with water if desired. From 0 to 10% by weight (based on the solids) of an emulsion or dispersion auxiliary can also be used during their production.

The aqueous silicone polyester combination resins obtained are excellent binders and can be combined with the conventional pigments, fillers and lacquer additives. Hardening takes place thermally and leads to finishes and coatings with very good properties such as good weather- and heat-resistance, adhesion, lustre, colour maintenance, hardness, good elasticity and slight thermoplasticity.

Suitable polyesters which are rich in hydroxyl and acids groups can be produced by condensation, for example melt condensation or azeotropic condensation, and they can also be produced in a two-stage process. In this case, a polyester preliminary product which is rich in hydroxyl groups (for example, having a molar ratio of polyalcohol to polycarboxylic acid of from 1:1 to 1.3:1) and which has an acid number below 50, preferably below 15, is reached with a polycarboxylic acid anhydride to form the corresponding semi-ester in a sufficient quantity for the resulting "acidified" polyester to have an OH-number higher than 30 and an acid number of between 50 and 170, preferably from 80 to 130.

Acid polyester obtained in a one-step-process yield silicone polyester-resin systems the properties of which are not as good as those obtained in a two-step-process (the resulting lacquers are of lower elasticity and slighter lustre).

Suitable polyesters are formed by the reaction of, among other compounds, terephthalic acid, isophthalic acid, phthalic acid, pyromellitic acid, trimellitic acid or their esters (for example methyl esters) or anhydrides with polyhydric alcohols such as, for example, ethylene glycol, butane diol, trimethylol propane, glycerine, pentaerythritol and neopentyl glycol.

Suitable catalysts such as, for example, lead, zinc, tin, iron, nickel, magnesium, cobalt, alkali and alkaline earth metal compounds can be used for the production of the polyester.

The reaction generally takes place smoothly at temperatures between 150° and 250° C. The reaction preferably takes place in the absence of solvents, but solvents having a boiling point above 110° C., for example toluene, can optionally be used or added upon completion of the reaction.

Silicone precondensates within the scope of the present invention are produced by hydrolysis or partial hydrolysis of organosilanes corresponding to the formula (I):

$$R_a^I R_b^{II} R_c^{III} SiX_{4-(a+b+c)} \quad (I)$$

in which $R^I$, $R^{II}$ and $R^{III}$ are radicals selected from optionally halogen-substituted monovalent hydrocarbon radicals, X is a hydrolysable radical selected from halogen, alkoxy, aryloxy and acyloxy radicals, and the sum of a, b and c is an integer from 1 to 3.

Examples of the radicals $R^I$, $R^{II}$ and $R^{III}$ include alkyl groups such as methyl and ethyl or aryl groups such as phenyl groups. Specific examples of organochlorosilanes in the scope of formula (I) include methyl trichlorosilane, dimethyl dichlorosilane, methylphenyl dichlorosilane, phenyl trichlorosilane, diphenyldichlorosilane and mixtures thereof.

The lower alkyl groups and the phenyl group impart greater heat stability to the silicone materials, and these groups and mixtures of them are therefore preferred radicals for $R^I$, $R^{II}$ and $R^{III}$ in formula (I).

However, up to 25% by weight of the material containing radicals different from methyl, ethyl and phenyl groups or their derivatives can be tolerated without seriously impairing the heat stability. The precise proportions of each of the organosilanes in the mixture depend upon the particular properties which are desired in the end product. Thus, for example, a large quantity of methyl groups leads to a rather brittle product, while too large a quantity of phenyl groups leads to a product with increased thermoplasticity.

Silicone precondensates corresponding to the following formula (II) are obtained during the hydrolysis or partial hydrolysis treatment:

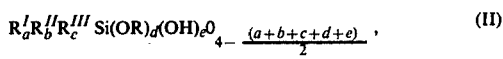

$$R^I_a R^{II}_b R^{III}_c \text{Si}(OR)_d(OH)_e O_{4-\frac{(a+b+c+d+e)}{2}}, \quad (II)$$

in which $R^I$, $R^{II}$ and $R^{III}$ have the meaning already given above, the sum of a, b and c has an average value of 1 to 1.75, d and e each have a value of from 0 to 2, the sum of d+e is 0.5 to 2 on average, the sum of a, b, c, d and e is not greater than 3 and OR is an alkoxy, etheralkoxy, aryloxy or acyloxy radical. Preferred OR radicals include lower aliphatic alkoxy groups such as methoxy, ethoxy, propoxy and butoxy groups.

Partially hydrolysed alkoxy silanes are obtained by the addition of less than the quantity of water theoretically required to the alkoxy silane or by addition of the stoichiometric quantity of water and alcohol to the corresponding chlorosilanes. In this process, the quantity of water should be calculated in such a way that the ratio of alkoxy groups to silicon lies in the given ratio.

The preferred methoxy content lies between 10 and 20% by weight. If a predominantly hydroxy-functional silicone precondensate is used, the preferred hydroxy content lies between 2 and 12% by weight.

The condensation of the polyester resin with the silicone precondensate can be catalysed by the addition of, for example, zirconium and titanium acid esters, trifluoro acetic acid and the metal compounds already mentioned above. Quantities of catalysts of from 0.1 to 0.001% by weight are generally sufficient.

The reaction preferably takes place in the presence of a suitable solvent at temperatures between 100° and 250° C., optionally using a catalyst and/or reduced pressure, to a degree of reaction of about 20 to 80%, preferably 30 to 70% (measured, for example, by the quantity of alcohol or water removed during condensation).

Suitable solvents include, for example, glycol ether acylates of a carboxylic acid, such as ethylene glycol monoethylether acetate, ethylene glycol monomethylether acetate, ethylene glycol monobutylether acetate, aromatic solvents such as toluene or xylene, mixtures of aromatic solvents, and also ketones such as cyclohexanone.

Solvents containing a hydroxyl group, such as, for example, methyl glycol, ethyl glycol, butyl glycol, propanol and/or butanol are preferably added to the condensation product in a quantity of up to 50% (based on the solvent mixture).

The hydroxyl group contained in the solvents, which have to evaporate below the stoving temperature, sometimes compete with the COH groups of the polyester and the majority of them are then removed from the product of the process by ester interchange reactions during the stoving operation. This allows a greater range of variation in the stoving period, i.e. the embrittlement of the lacquers which would otherwise be observed if the stoving temperature were allowed to act for too long is delayed. Moreover, their addition serves to adjust the viscosity of the product.

The total quantity of organic solvents should be as small as possible. The limits are determined, on the one hand, by the viscosity of the combination resin which should still be readily processible and, on the other hand, by the solids content of the end product which should preferably be from 50 to 75% by weight. A total quantity of organic solvents of between 10 and 60% by weight (based on the solid material) is preferably used.

The ratio of polyester resin to silicone precondensate is preferably selected, for subsequent use, in such a way that the combination resin contains from 30 to 80% by weight of polysiloxane. In contrast to the teaching in German Auslegeschrift No. 2,232,419, the ratio of reactive OH-groups to SiOR-groups is immaterial.

It is also advantageous to select the proportion of the polyester and its acid number in such a way that the acid number is higher than 25, preferably from 35 to 55, based on the combination resin. The acid silicone polyester combination resin obtained in this way is then preferably filtered, optionally with the aid of a filtration auxiliary such as diatomaceous earth.

The acid-functional silicone polyester combination resin is converted into the corresponding salts by adding suitable amines. The quantity of amines is preferably calculated in such a way that a dilution containing 50% by weight of the silicone polyester combination resin with water and optionally organic solvents has a pH value of between 6.5 and 9 and polyester resins (without precondensation mixtures of silicone are produced, for example, by initially dissolving or emulsifying and dispersing the acid polyester in water with the aid of a suitable nitrogen base and then mixing it with the silicone precondensate. It is, however, also feasible according to the invention to mix the silicone precondensate with the polyester first of all or to carry out mixing in one stage. Suitable amines include for example, ammonia, primary, secondary and tertiary alkyl amines such as methylamine, diethylamine, triethylamine, and amino alcohols such as ethanolamine, diethanolamine, triethanolamine, N-methylethanolamine, N,N-dimethylethanolamine, 3-aminopropanol and their ethers such as 3-methoxy propyl amine, but also, for example, morpholine.

Triethylamine, diethanolamine and dimethylethanolamine have proven particularly suitable in addition to $NH_3$.

The mixtures which are adjusted to the abovementioned pH range can be further diluted with water as required.

The system according to the invention surprisingly forms emulsions or dispersions of high stability even without the addition of special emulsion and dispersion auxiliaries. Up to 10% by weight (based on the solid material) of emulsion or dispersion auxiliaries can additionally be used providing their use does not have an adverse effect on the subsequent properties of the lacquer. Emulsion and dispersion auxiliaries which are suitable for this purpose include neutral ones such as, for example, polyoxyethylene stearate and anionic ones such as, for example, sodium dodecyl sulphonate, as well as cationic ones such as, for example, dimethyl dodecyl benzyl ammonium chloride.

In the scope of the present invention, it is generally immaterial whether the acid silicone polyester combination resin or mixture is firstly neutralised with the amine and then stirred with water, or whether the amine is added at the same time as the water.

The time at which an emulsion or dispersion auxiliary is optionally added is not usually critical either, whether it is added to the combination resin, to the water or later on. However, the combination resin is preferably added to the water. It is important that the components are thoroughly stirred and this is advantageously performed with a dissolver. The circumferential speed of the dispersion disc should preferably be about 20 m/sec.

These products can be homogenised even better and possibly improved in their stability selectively by the use of specific emulsion machines, but the size and distribution of the particles are generally sufficiently good.

The stable emulsions and dispersions which are obtained in this way and which are adjusted by the addition of water to a solids content of from 40 to 70% by weight, preferably 50% by weight, and whose viscosity amounts to about 100 to 15,000 centipoise at 25° C., preferably 1000 to 6000 centipoise (a conventional thickener can optionally be added if the viscosity is too low) have excellent properties as lacquer binders. They can be combined with conventional pigments and lacquer additives such as, for example, polishing and flowing agents, and produce coatings and finishes with excellent properties when reacted with pigments and also as clear lacquers. It is advantageous to add the pigments in the form of an aqueous powder composition. However, it is also possible, according to the invention, to pigment the silicone polyester combination resin first of all (water-free) and only to mix it with water afterwards. It is also possible according to the invention to add fillers.

Hardening is effected by heating the material to 180° to 350° C., as is normal with stoving lacquers.

In contrast to the prior art, the curing of the aqueous lacquers produced according to the invention is not effected by the addition of specific condensation resins such as, for example, amino plastics or by means of double bonds, but only by a condensation reaction of the COH—, SiOR— or SiOH-groups with each other.

The subject of the present invention is explained in further detail in the following Examples. They disclose that the products according to the invention combine in an advantageous manner the desirable properties known from the prior art of stoving lacquers composed of silicone polyester combination resins with the advantages of water dilutability and a small content of organic solvents.

The parts and percentages given in the following Examples are parts by weight or percentages by weight, unless otherwise stated. The solids contents indicated have been obtained after thoroughly heating the mixture for 3 hours at 120° C. in a drying cabinet. Ph denotes the phenyl radical and Me denotes the methyl radical.

EXAMPLE 1

Part A: Production of an "acidified" polyester:

32.06 parts of trimethylol propane, 5.56 parts of ethylene glycol and 35.01 parts of terephthalic acid were firstly condensed by the two-stage process at 250° C. with the separation of 7.58 parts of water up to an acid number of <3 and then reacted at 135° C. with 34.95 parts of phthalic acid anhydride. The resulting "acidified" polyester has an acid number of 99 and an OH number of 165.

Part B: Production of a silicone precondensate:

A mixture of 64.88 parts of $PhSiCl_3$ and 7.90 parts of $Me_2SiCl_2$ were reacted by the method of partial hydrolysis at a temperature of 30° to 40° C. with 21.29 parts of $CH_3OH$ and 5.30 parts of $H_2O$, with the elimination of HCl, and the volatile constituents were then removed at up to 150° C. and 20 mbar. The resulting silicone prepolymer had a viscosity of 384 cP and a methoxy content of 14.65%.

Part C: Production of a silicone polyester combination resin 31.80 parts of the "acidified" polyester from Part A, 41.59 parts of the silicone precondensate from Part B, 24.04 parts of methyl glycol acetate and 0.02 parts tetrabutyl titanate were reacted at 125° C. with the separation of 3.12 parts of $CH_3OH$. 3.67 parts of butanol were then added and the product was filtered. The resulting silicone polyester combination resin had a viscosity of 3130 cP and a solids content of 74.2%.

Part D: Production of an aqueous silicone combination resin system:

67.3 parts of the silicone polyester combination resin from Part C were introduced into a container with a fast running stirrer and were homogeneously stirred with 1 part of polyoxyethylene stearate and 4.5 parts of butyl glycol at 20° to 40° C. 24.5 parts of distilled $H_2O$ and 2.7 parts of a 25% aqueous $NH_3$ solution were then added over 10 minutes at a temperature of 30° to 50° C., also with rapid stirring. The resulting emulsion had a viscosity of 3400 cP and was still stable after 60 days. It was composed of 51.6% by weight of solid material, 2.3% by weight of butanol, 4.5% by weight of butyl glycol, 15.1% by weight of methyl glycol acetate and 26.5% by weight of water.

Part E: Production of a lacquer 38.7 parts of pigment A were added to 100 parts of the aqueous silicone polyester combination resin system from Part D with rapid stirring (55.3 parts of a titanium dioxide suspension containing 70% solids) and stirring was continued for 10 minutes. For processing purposes, the lacquer was diluted with a further 15.5 parts of water to give an outflow time of 32 seconds (measured in accordance with DIN 53 211 at 20° C.; DIN beaker with an outflow nozzle of 4 mm diameter).

The lacquer was composed of 52.9% by weight of solid material, 1.3% by weight of butanol, 2.6% by weight of butyl glycol, 8.8% by weight of methyl glycol acetate and 34.4% by weight of water.

The lacquer was sprayed on to a deep drawing plate (wet layer thickness: 75 μm) and stoved for 1 hour at 200° C. The dry layer was about 25 μm thick and the film of lacquer had the following properties: Elasticity (Erichsen deep drawing in μm): 4.0–4.2 Lead pencil hardness (measured in accordance with DIN 46453)

: at 20° C.: 5 H
: at 180° C.: 2 H

Lustre (60° Gardner lustre measuring instrument): 91

Yellowing: the change in the shade of colour of the lacquer film was minimal with thermal ageing for 100 hours at 250° C.

EXAMPLE 2 (Comparison Example)

An "acidified" polyester having an acid number of 47 and an OH number of 213 was produced in accordance with Example 1, Part A. It was reacted with the silicone precondensate from Example 1, Part B, as in Example 1, Part C. A silicone polyester combination resin which had a viscosity of 2800 cP and a solids content of 73.8% was produced.

67.3 parts of the above silicone polyester combination resin were introduced into a container with a fast running stirrer and stirred homogeneously with 1 part of polyoxyethylene stearate and 4.5 parts of butyl glycol at 20° to 40° C. 24.5 parts of distilled $H_2O$ and 1.3 parts of 25% $NH_3$ solution were then added at a temperature of 30° to 50° C., also with rapid stirring, over 10 minutes.

The resulting emulsion dissociated after a few hours. The acid number of the polyester or the acid number based on the silicone polyester combination resin was too low.

EXAMPLE 3

Part A: An "acidified" polyester having an acid number of 157 and an OH number of 108 was produced in accordance with Example 1, Part A.

Part B: A silicone precondensate which contained 37 mol % of $Ph_2SiO$, 27 mol % of $PhSiO_{3/2}$ and 36 mol % of $Me_2SiO$ and had a methoxy content of 14.1% by weight and a viscosity of 270 cP was produced in accordance with Example 1, Part B.

Part C: 20 parts of the "acidified" polyester from Part A, 60.0 parts of the silicone precondensate from Part B, 16.9 parts of methyl glycol acetate and 0.02 parts of tetrabutyl titanate were reacted at 125° C. and with the separation of 0.92 parts of $CH_3OH$. 4.0 parts of butanol were then added and the product was filtered. The resulting silicone polyester combination resin had a viscosity of 2600 cP and a solids content of 79.4%.

Part D: 32.1 parts of distilled $H_2O$, 1.9 parts of a 25% $NH_3$ solution and 3.0 parts of butanol were introduced into a container with a fast running stirrer.

63.0 parts of the silicone polyester combination resin from Part C were then added over 10 minutes with rapid stirring and stirred for a further 20 minutes. The resulting emulsion had a viscosity of 3200 cP and was still stable after 60 days. The solids content was 50.1%.

Part E: The aqueous silicone polyester combination resin system from Part D was pigmented in accordance with Example 1 and adjusted to an outflow time of 32 seconds.

The lacquer was injected over a deep drawing plate (wet layer thickness: 75 μm) and stoved for 1 hour at 200° C. The dry layer thickness was about 25 μm and the lacquer film had the following properties:

Elasticity (Erichsen deep drawing in μm): 7.1–7.2

Lead pencil hardness (measured in accordance with DIN 46 463)
at 20° C.: 3 H
at 180° C.: H Lustre (60° C. Gardner lustre measuring instrument): 90

Yellowing: the change in the shade of colour of the lacquer film was minimal after thermal ageing for 100 hours at 250° C.

EXAMPLE 4

An "acidified" polyester having an acid number of 137 and an OH number of 126 was produced in accordance with Example 1, Part A.

23.7 parts of this polyester were reacted with 31.0 parts of the silicone precondensate from Example 1, Part B, 5.5 parts of xylene and 0.02 parts of tetrabutyl titanate at 120° C. with the separation of 1.12 parts of $CH_3OH$. 31.1 parts of distilled $H_2O$, 2.7 parts of butyl glycol, 1.6 parts of sodium dodecyl sulphate and 5.5 parts of N-dimethylethanolamine were then added quickly. The mixture was then stirred for 20 minutes with a dissolver (20 m/s circumferential velocity). The resulting emulsion had a viscosity of 2900 cP, a solids content of 55% and was still stable after 60 days.

EXAMPLE 5

An 80% silicone resin solution containing 15.2% by weight of SiOH (based on solid resin) was produced by reacting the silicone precondensate from Example 3, Part B, with water and methanol.

31.2 parts of the silicone resin solution were reacted with 25.0 parts of the "acidified" polyester from Example 4 and 7.5 parts of xylene at 140° C., with the separation of 6 parts of $CH_3OH/H_2O$. A mixture of 35.4 parts of distilled $H_2O$, 4.4 parts of 25% aqueous $NH_3$ solution and 2.5 parts of butanol was then added quickly. The mixture was then stirred for 20 minutes with a dissolver (20 m/s circumferential velocity). The resulting emulsion had a viscosity of 4600 cP and a solids content of 50.3% and was still stable after 60 days.

EXAMPLE 6

27.7 parts of the "acidified" polyester from Example 1, Part A, 36.2 parts of the silicone precondensate from Example 1, Part B, 22.7 parts of methyl glycol acetate and 0.02 parts of tetrabutyl titanate were reacted at 125° C. with the separation of 2.6 parts of $CH_3OH$. 3.2 parts of isopropanol and 12.78 parts of butyl glycol were then added and the product was filtered. The resulting silicone polyester combination resin had a viscosity of 970 cP and a solids content of 64.9%.

77 parts of this combination resin were ground with 37.5 parts of solid pigment (titanium dioxide) and then added to 51 parts of distilled $H_2O$ and 2.6 parts of a 25% $NH_3$ solution with rapid stirring and stirred for 20 minutes. The finished lacquer had a solids content of 52.1% and was still stable after 60 days.

Application technology testing produced the same good values as in Example 1.

EXAMPLE 7

Production of an aqueous silicone polyester resin system (Mixture)

25.5 parts of the "acidified" polyester from Example 1

29.9 parts of distilled $H_2O$, 7.5 parts of isopropanol, 3,1 parts of a 25% aqueous $NH_3$ solution and 0.6 parts of polyoxyethylene stearate were stirred homogeneously at 20° to 40° C. 33.4 parts of the silicone precondensate from Example 1 Part B were then added over 30 minutes with rapid stirring at a temperature of 30° to 50° C. and were stirred for a further 20 minutes.

The resulting emulsion had a viscosity of 3500 cP and was still stable after 60 days. It was composed of 60.3% by weight of solid material, 32.2% by weight of water, and 7.5% by weight of isopropanol.

The average particle size of the emulsion was 0.365μ and the distribution range was 0.3.

Part D: Production of a lacquer 45.2 parts of pigment in a titanium dioxide suspension with 70% solids content were added to 100 parts of the aqueous silicone polyester resin system from Part C with rapid stirring and were stirred for 10 minutes.

For processing purposes, the lacquer was diluted with a further 8.8 parts of water to give an outflow time of 35 seconds (measured in accordance with DIN 53 211 at 25° C.; DIN beaker with an outflow nozzle of 4 mm diameter). The lacquer was composed of: 60.5% by weight of solids, 35.2% by weight of water and 4.3% by weight of isopropanol.

The lacquer was sprayed on to a deep drawing plate (wet layer thickness: 70 μm) and stoved for 1 hour at 20° C. The dry layer was about 25 μm thick and the lacquer film had the following properties:

Elasticity (Erichsen deep drawing in μm): 3.1 to 3.3

Lead pencil hardness (measured in accordance with DIN 46 453):

at 20° C.: 6 H
at 180° C.: 2 H

Lustre (60° Gardner lustre measuring instrument): 87

Yellowing: the change in shade of colour of the lacquer film during thermal ageing for 100 hours at 250° C. was minimal.

EXAMPLE 8 (Comparison Example)

An "acidified" polyester having an acid number of 47 and an OH-number of 213 was produced in accordance with Example 1, Part A. It was reacted with the silicone precondensate from Example 7, Part B, in accordance with Example 1, Part C:

25.5 parts of the above "acidified" polyester, 31.5 parts of distilled $H_2O$, 7.5 parts of isopropanol, 1.5 parts of a 25% aqueous $NH_3$ solution and 0.6 parts of polyoxyethylene stearate were stirred at 20° to 40° C. 33.4 parts of the silicone precondensate were then added over 30 minutes at a temperature of 30° to 50° C. with rapid stirring and were stirred for a further 20 minutes.

The resulting emulsion dissociated after a few hours. The acid number of the polyester or the acid number based on the total solids was too low.

EXAMPLE 9

Part A: An "acidified" polyester having an acid number of 157 and an OH number of 108 was produced in accordance with Example 1, Part A.

Part B: A silicone precondensate containing 37 mol % of $Ph_2SiO$, 27 mol % of $PhSiO_{3/2}$ and 36 mol % of $Me_2SiO$ and having a methoxy content of 14.1% by weight and a viscosity of 270 cP was produced in accordance with Example 1, Part B.

Part C: 12.4 parts of the "acidified" polyester from Part A, 27.9 parts of distilled $H_2O$, 4.6 parts of isopropanol, 3.1 parts of butanol and 2.4 parts of a 25% aqueous $NH_3$ solution were stirred homogeneously at 20° to 40° C. 49.6 parts of the silicone precondensate from Part B were then added over 30 minutes at a temperature of 30° to 50° C. with rapid stirring. The resulting emulsion had a viscosity of 4100 cP and was still stable after 60 days. The solids content was 63.1%.

Part D: The aqueous silicone polyester resin system from Part C was pigmented in accordance with Example 1 and adjusted to an outflow time of 32 seconds. The lacquer was sprayed on to a deep-drawn sheet (thickness of wet layer: 73 μm) and stoved for 1 hour at 200° C. The dry layer was about 28 μm thick and the lacquer film had the following properties:

Elasticity (Erichsen deep drawing in μm): 7.3 to 7.6

Lead pencil hardness (measured in accordance with DIN 46 453):

at 20° C.: 3H
at 18° C.: H

Lustre (60° Gardner lustre measuring instrument): 88

Yellowing: the change in the shade of colour of the lacquer film was maximal after thermal ageing for 100 hours at 250° C.

EXAMPLE 10

A silicone precondensate containing 17 mol % of $Ph_2SiO$, 13 mol % of $Me_2SiO$ and 70 mol % of $PhSiO_{3/2}$ and having an isopropoxy content of 19.3% by weight and a viscosity of 1355 cP was produced in accordance with Example 1, Part B.

A mixture of 18.3 parts of the "acidified" polyester from Example 1, Part A, 7.9 parts of butyl glycol and 2.2 parts of a 25% aqueous $NH_3$ solution was added to 42.7 parts of the above silicone precondensate over 30 minutes at 30° to 50° C. with rapid stirring. The mixture was then stirred for 20 minutes. The resulting emulsion had a viscosity of 3800 cP and was still stable after 60 days. The solids content was 60.8%.

EXAMPLE 11

An "acidified" polyester having an acid number of 136 and an OH number of 129 was produced in accordance with Example 1, Part A.

25.6 parts of this polyester, 3.2 parts of butanol, 5.5. parts of N-dimethyl ethanolamine and 20.8 parts of distilled $H_2O$ were mixed at 20° to 40° C. and then filtered. A mixture of 38.5 parts of the silicone precondensate from Example 1, Part B, and 6.4 parts of xylene were added to this mixture for 30 minutes at 30° to 50° C. with rapid stirring and stirred for a further 20 minutes (dissolver, 20 m/s circumferential velocity). The resulting emulsion had a viscosity of 1850 cP and a solids content of 65.2%, and was still stable after 60 days.

EXAMPLE 12

An 80% silicon resin solution in xylene containing 14.8% by weight of SiOH (based on solid resin) was produced by reacting the silicone precondensate from Example 9 Part B, with water and methanol, addition of xylene and removal of $MeOH/H_2O$.

44.9 parts of this silicone resin solution were added to a mixture of 23.9 parts of the "acidified" polyester from Example 5, 3.0 parts of butyl glycol, 4.0 parts of a 25% aqueous $NH_3$ solution and 24.2 parts of distilled $H_2O$ over 30 minutes at 30° to 50° C. with rapid stirring.

The mixture was then stirred for 20 minutes (dissolver, circumferential speed of 20 m/s).

The resulting emulsion had a viscosity of 4500 cP and a solids content of 60.4%, and was still stable after 60 days.

EXAMPLE 13

27.8 parts of solid pigment were added (at 20° to 40° C.) to a mixture of 16.0 parts of the "acidified" polyester from Example 1, Part A, 3.7 parts of isopropanol, 20 parts of a 25% aqueous $NH_3$ solution and 29.5 parts of distilled $H_2O$ and stirred for 30 minutes (dissolver, circumferential speed of 20 m/s). 21.0 parts of the silicone precondensate from Example 1, Part B, were then added over 20 minutes at a temperature of 20° to 40° C. with rapid stirring, and stirring was continued for a further 20 minutes.

The resulting mixture had a viscosity of 2300 cP and a solids content of 64.7%, and was still stable after 60 days.

Application technology testing produced the same good values as in Example 7.

EXAMPLE 14

27.8 parts of titanium dioxide pigment were added to a mixture of 21.0 parts of the silicone precondensate from Example 1, Part B, and 1.9 parts of butyl glycol at 20° to 40° C. with rapid stirring, and stirring was continued for 30 minutes (dissolver, circumferential velocity of 20 m/s). A mixture of 16.0 parts of the "acidified" polyester from Example 1, Part A, 3.7 parts of isopropanol, 2.0 parts of a 25% aqueous $NH_3$ solution and 27.6 parts of distilled $H_2O$ was then added at a temperature of 20° to 40° C. with rapid stirring, and stirring was continued for a further 20 minutes.

The resulting mixture had a viscosity of 1800 cP and a solids content of 64.3%, and was still stable after 60 days.

Application Technology tests gave the same good values as in Example 7.

We claim:

1. An aqueous silicone polyester resin system having a silicone content of at least 30% by weight, based on the solid binder, comprising (a) (i) a polyester resin having an acid number of from 50 to 170 and a silicone precondensate with SiOH or SiOR-functionality or (a) (ii) a silicone-polyester-copolymer resin having an acid number of from 25 to 110; (b) based on the solid binder from 0 to 80% by weight of an organic solvent; (c) from 0 to 10% by weight, based on the solid binder, of an emulsion or dispersion auxiliary; (d) a nitrogen base; and (e) optionally at least one pigment or filler, the polyester of (a) (i) or (a) (ii) being formed by reaction of an acid selected from the group consisting of terephthalic acid, isophthalic acid, phthalic acid, pyromellitic acid or trimellitic acid or an ester or anhydride thereof with a polyhydric alcohol selected from the group consisting of ethylene glycol, butane diol, trimethylol propane, glycerine, pentaerythritol and neopentyl glycol.

2. A process for the production of an aqueous silicone polyester resin system which comprises emulsifying or dispersing in water (a) (i) a polyester resin with an acid number of from 50 to 170 and a silicone precondensate with SiOH or SiOR functionality; or (a) (ii) a silicon-polyester-copolymer resin having an acid number of from 25 to 110; (b) from 0 to 80% by weight, based on the solid binder, of an organic solvent; and (c) from 0 to 10% by weight based on the solid binder, of an emulsion or dispersion auxiliary, with the aid of (d) a nitrogen base, to form an aqueous silicone polyester resin system; optionally adding (e) at least one pigment or filler the polyester of (a) (i) or (a) (ii) being formed by reaction of an acid selected from the group consisting of terephthalic acid, isophthalic acid, phthalic acid, pyromellitic acid or trimellitic acid or an ester or anhydride thereof with a polyhydric alcohol selected from the group consisting of ethylene glycol, butane diol trimethylol propane, glycerine, pentaerythritol and neopentyl glycol; and adjusting the silicone content in such a way that it amounts to 30 to 80% by weight, based on the solid binder.

3. A process according to claim 2, wherein (a) (i) the silicone precondensate; a polyester resin containing hydroxyl and hydrocarboxyl groups or (a) (ii) a siliconpolyester-copolymer resin obtained by condensation of a silicon precondensate and a polyester resin, a nitrogen base and water, optionally an organic solvent, and an emulsion or dispersion auxiliary are mixed, and wherein the silicone precondensate has a composition of the formula

wherein $R^I$, $R^{II}$ and $R^{III}$ are optionally halogen-substituted, monovalent, aliphatic or aromatic hydrocarbon radicals with from 1 to 8 carbon atoms, the sum of a, b and c has an average value of from 1 to 1.75, d and e each have a value of from 0 to 2, the sum of d+e is from 0.5 to 2 on average, the sum of a,b,c,d and e is not greater than 3 and OR is an alkoxy, etheralkoxy, aryloxy or acyloxy radical with from 1 to 6 carbon atoms, and wherein the polyester resin has an OH number higher than 30 and an acid number of from 50 to 170.

4. A process according to claim 3, wherein the silicone precondensate has a methoxy content of from 10 to 20% by weight or a hydroxyl content of from 2 to 12% by weight.

5. A process according to claim 2, 3 or 4, wherein the acid polyester is dissolved or emulsified and dispersed in water with the aid of a nitrogen base and is subsequently mixed with the silicone precondensate.

6. A process according to claim 2, 3 or 4, wherein the aqueous silicone polyester resin system has a pH value of from 6.5 to 9.

7. A process according to claim 2, 3 or 4, wherein the aqueous silicone polyester resin system has a solids content of from 40 to 75% by weight.

8. A process according to claim 2, 3 or 4, wherein the aqueous polyester solution is firstly pigmented and only then mixed with the silicone precondensate.

9. A process according to claim 2, 3 or 4, wherein the silicone precondensate is firstly pigmented and only then mixed with the aqueous polyester solution.

10. An aqueous silicone polyester resin system prepared by a process according to claim 2, 3 or 4.

* * * * *